United States Patent
Marshall et al.

(10) Patent No.: US 8,184,045 B2
(45) Date of Patent: May 22, 2012

(54) PROCESSING OF SATELLITE POSITIONING SYSTEM SIGNALS

(75) Inventors: Christopher B. Marshall, Haywards Heath (GB); Saul Dooley, Reigate (GB)

(73) Assignee: NXP B.V., Eindhoven (NL)

( * ) Notice: Subject to any disclaimer, the term of this patent is extended or adjusted under 35 U.S.C. 154(b) by 143 days.

(21) Appl. No.: 12/738,189

(22) PCT Filed: Oct. 16, 2008

(86) PCT No.: PCT/IB2008/054258
§ 371 (c)(1), (2), (4) Date: Apr. 15, 2010

(87) PCT Pub. No.: WO2009/050671
PCT Pub. Date: Apr. 23, 2009

(65) Prior Publication Data
US 2010/0231446 A1    Sep. 16, 2010

(30) Foreign Application Priority Data
Oct. 19, 2007  (EP) .................................. 07118837

(51) Int. Cl.
*G01S 19/06*  (2010.01)
*G01S 19/05*  (2010.01)

(52) U.S. Cl. ............... 342/357.43; 342/357.42; 701/469

(58) Field of Classification Search ............ 342/357.21, 342/357.25, 357.42, 357.43, 357.46; 701/412, 701/469
See application file for complete search history.

(56) References Cited

U.S. PATENT DOCUMENTS

| 6,417,801 | B1 | 7/2002 | van Diggelen |
| 2002/0177950 | A1 | 11/2002 | Davies |
| 2004/0029583 | A1 | 2/2004 | Yamamoto et al. |
| 2004/0076223 | A1 | 4/2004 | Krasner et al. |
| 2005/0275726 | A1 | 12/2005 | Abraham et al. |

FOREIGN PATENT DOCUMENTS

| JP | 63-111485 A | 5/1988 |
| WO | 2006/117198 A1 | 11/2006 |

OTHER PUBLICATIONS

Lehtinen, Antti; "Doppler Positioning With GPS", Master's Thesis, Tampere Univ. of Techn., 70 pgs. (2001).
Souisisi, S. "Method of Assisting a Subscriber Unit with Geographic Data for Better Location Finding Accuracy"; Motorola Techn. Devs., vol. 42; pp. 20-21 (2001).
Marmasse, Natalia, et al. "Location Modeling—Workshop Position Paper"; MIT Media Laboratory; 6 pgs. (2001).

(Continued)

*Primary Examiner* — Dao Phan (57) ABSTRACT

The invention provides a method of processing signals from a satellite positioning system in which a user inputs an approximate indication of current position, and this is used when processing satellite samples to reduce the processing required or increase the reliability. This approach avoids the need for an automated approximate location system (for example using cellular telephony). This represents a change in the way GPS (or other satellite systems) is used. Instead of relying on a GPS system to provide a location in entirely automated manner, the approach is for the user to give an approximate location (which will generally be known), and for the GPS system then to correct this and provide an accurate location. This approach can enable the GPS system to function in areas where it would normally be unreliable.

20 Claims, 3 Drawing Sheets

OTHER PUBLICATIONS

Zewang,C. et al. "Development of an Algorithm for Car Navigation System Based on Dempster-Shafer Evidence Reasoning"; Proc. IEEE 5$^{th}$ Int'l. Conf. on Intelligent Transportation Systems, pp. 534-37 (Sep. 2002).

Anonymous "Assisting Mobile Device Positioning Using Coordinate Reading"; Research Disclosure Database No. 483076, 2 pgs. (Jul. 2004).

International Search Report and Written Opinion for Int'l. Patent Appln. No. PCT/IB2008/054258 (Mar. 4, 2009).

PROCESSING OF SATELLITE POSITIONING SYSTEM SIGNALS

This invention relates to satellite positioning systems, such as GPS, and in particular relates to the processing of the signals within such a system.

The global positioning system is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just under 24 hours.

Each satellite transmits on several frequencies. Civilian GPS receivers currently use the 'L1' frequency of 1575.42 MHz. The satellite orbits are roughly 25,000 kilometres from the earth's centre, or 20,000 kms above the earth's surface. The orbital paths of these satellites take them between roughly 60 degrees North and 60 degrees South latitudes.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This part of the signal is essential to a GPS receiver determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional GPS receiver reads the transmitted data message and saves the ephemeris, almanac and other data for continual use. This information can also be used to set (or correct) the clock within the GPS receiver.

To determine position, the GPS receiver compares the time a signal was transmitted by a satellite with the time it was received by the GPS receiver. The time difference tells the GPS receiver how far away that particular satellite is. By combining distance measurements from multiple satellites, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude.

By processing the apparent Doppler shifts of the signals from the satellites, a GPS receiver can also accurately provide speed and direction of travel (referred to as 'ground speed' and 'ground track').

A complete data signal from the satellites consists of a 37,500 bit Navigation Message, which takes 12.5 minutes to send at 50 bps. The data signal is divided into 25 30 s frames, each having 1500 bits, and these are divided into five 6 s subframes. Each 6 s subframe is divided into ten 30 bit words. All the information necessary for a position fix (ephemeris etc) is contained within each frame and so a GPS receiver will typically take around 30 s to produce a position fix from a so-called cold start.

The first word of each 6s subframe contains a preamble to enable receivers to recognise the start of the subframe. The next word is the handover word which gives timing information since the last restart of GPS time (which takes place every Saturday/Sunday at midnight). The remaining 8 words provide the ephemeris, almanac and clock information, depending on the subframe.

The first subframe gives clock correction data, the second and third subframes give ephemeris data and the almanac data is in the fourth and fifth subframes.

The SVs all broadcast on the same frequency. In order to distinguish a signal from a particular satellite, the receiver needs to generate a replica of the C/A code known to be in use by that satellite and align it so that it is synchronised with the incoming signal which will be delayed by an unknown amount predominantly due to the time of flight of the signal in travelling from the satellite to the receiver (typically around 0.07 s). In general it is not possible for a receiver to accurately predict the alignment necessary to get the replica in sync with the incoming signal, so some form of search is required, with a number of alignments being tried in turn and the best match being selected. This process of evaluating a number of candidate alignments is normally termed correlation as the receiver implements a correlation function between the received signal and the known C/A code for each satellite in turn, to determine if the received signal includes a component having the C/A code from a particular SV. The correlation function has to be calculated for multiple relative timings, and when the correlation peak is found, this corresponds to a particular timing and a particular SV. The discovered timing in turn corresponds to a particular distance from the SV.

The determined code phase, i.e. the timing of the peak of the correlation function, reveals the accurate timing information for use in the distance calculation. However, as the code is repeated every millisecond, the coarse timing also needs to be determined. Typically, less frequently repeating data components are used for the more coarse timing evaluation (i.e. to enable GPS time to be derived), such as the individual bits of the 50 bps data message and specific parts of it such as the subframe preamble or subframe handover word.

The integration period over which the correlation function is performed determines how easily a signal encoded with a particular code can be identified; in general, the longer the integration period, the more reliably the correct code phase should be reported for a given signal strength. The weaker the signal to be detected, the longer the integration period needs to be to achieve the same level of reliability.

Nearly all current and historical GPS receivers work by processing signals from the satellites in "real time", as they come in, reporting the position of the device at the current time. Techniques associated with such conventional receivers are well known.

Such "conventional" GPS receivers invariably comprise:
an antenna suitable for receiving the GPS signals,
analogue RF circuitry (often called a GPS front end) designed to amplify, filter, and mix down to an intermediate frequency (IF) the desired signals so they can be passed through an appropriate analogue-to-digital (ND) convertor at a sample rate normally of the order of a few MHz, digital signal processing hardware that carries out the correlation process on the IF data samples generated by the ND converter, normally combined with some form of micro controller that carries out the "higher level" processing necessary to control the signal processing hardware and calculate the desired position fixes However, the less well known concept of "Store and Process Later" has also been investigated. This involves storing the IF data samples collected by a conventional antenna and analogue RF circuitry in some form of memory before processing them at some later time (seconds, minutes, hours or even days) and often at some other location, where processing resources are greater.

The key advantages of the Store and Process Later approach over conventional GPS receivers are that the cost and power consumption of the capturing device are kept to a minimum as no digital signal processing needs be done at the time of capture, and the grabs can be very short (e.g. 100 ms). If the subsequent signal processing is done when the relevant satellite data (ephemeris etc) can be obtained via some other method, this approach also removes the need to decode the (very slow) data message from the SVs in the capturing device, which in many cases leads to unacceptably long times to start up conventional devices.

For example, a number of small capture devices which store short "grabs" of IF data samples into memory can subsequently upload their IF data grabs to a shared central computer which would not only carry out the necessary signal processing (correlation etc), but would also have access to a database of recent satellite information (ephemeris etc) by being connected to one or more conventional GPS receivers which relayed key parts of the GPS data message they received to the central computer.

However, the ease and effectiveness of subsequent processing is affected by the manner in which the IF data is collected. It is desirable to store as little data as possible to reduce memory and processing requirements, but this makes obtaining a position fix more difficult.

In either case, it is desirable to reduce the amount of processing required to obtain a position fix. It has been recognised that an independent position estimate can be used to simplify the processing required to produce an accurate position fix. For example in an assisted GPS system ("AGPS"), an estimated location is provided to the GPS receiver, to assist in situations in which the GPS signals are weak, for example indoors. The estimated position is provided automatically, for example by a cellular base station serving the device, or as the previous position fix.

There are many situations where an automatic position estimate is not available, including store and process later systems.

According to the invention, there is provided a method of processing signals from a satellite positioning system, comprising:

receiving an indication of approximate location which has been provided directly by a user;

receiving data samples of satellite broadcast received at a location corresponding to the indication;

processing the samples using the indication of approximate location to derive a more accurate position than the approximate location indication.

In most cases, a user of a GPS (or other satellite) system will know their approximate position, for example the town they are in. This can be entered into the system to enable a longitude/latitude approximate location to be determined.

This is then used (in conventional manner) to assist in performing a position fix. This can enable position fixes to be performed when otherwise they would be impossible, erroneous or very slow. The invention essentially provides assisted GPS operation even when no automatic location estimate is available.

Receiving an approximate location can comprise receiving a geographical place name or a landmark name, and deriving corresponding position information using a database, or receiving a user-selected place name, and deriving corresponding position information using a database. The method may further comprise deriving from the approximate location a range of possible position values for use in processing the samples. In this way, the user can enter a location to different levels of accuracy, and according to the accuracy, the information can be more or less useful to assist in the subsequent processing.

The samples preferably comprise intermediate frequency downconverted data samples and the satellite broadcast data comprise CDMA data.

The processing of samples can take place when and where the data samples are received. This provides a real-time position tracking system.

Instead, the invention can be applied to a so-called store and process later system, in which the data samples and the approximate indication of current position are stored, and the processing of samples takes place subsequently and not necessarily where the samples are received.

The invention also provides a method of operating a satellite positioning system, comprising:

a user entering an approximate indication of location;

receiving data samples of satellite broadcast using the system; and processing the samples using the approximate indication of current position to derive a more accurate position than the approximate location indication.

The invention also provides a system for collecting data from a satellite positioning system, comprising:

a user interface adapted to receive from a user an indication of approximate location;

a satellite receiver for receiving data samples of satellite broadcast; and processing means for processing the samples using the indication of approximate location to derive a more accurate position than the approximate location indication.

Examples of the invention will now be described in detail with reference to the accompanying drawings, in which.

The invention provides a method of processing signals from a satellite positioning system (e.g. GPS) in which a user inputs an approximate indication of current position, and this is used when processing GPS samples to reduce the processing required or increase the reliability. This approach avoids the need for an automated approximate location system (for example using cellular telephony). This represents a change in the way GPS is used. Instead of relying on a GPS system to provide a location in entirely automated manner, the approach is for the user to give an approximate location (which will generally be known), and for the GPS system then to correct this and provide an accurate location. This approach can enable the GPS system to function in areas where it would normally be unreliable.

Figure 1:
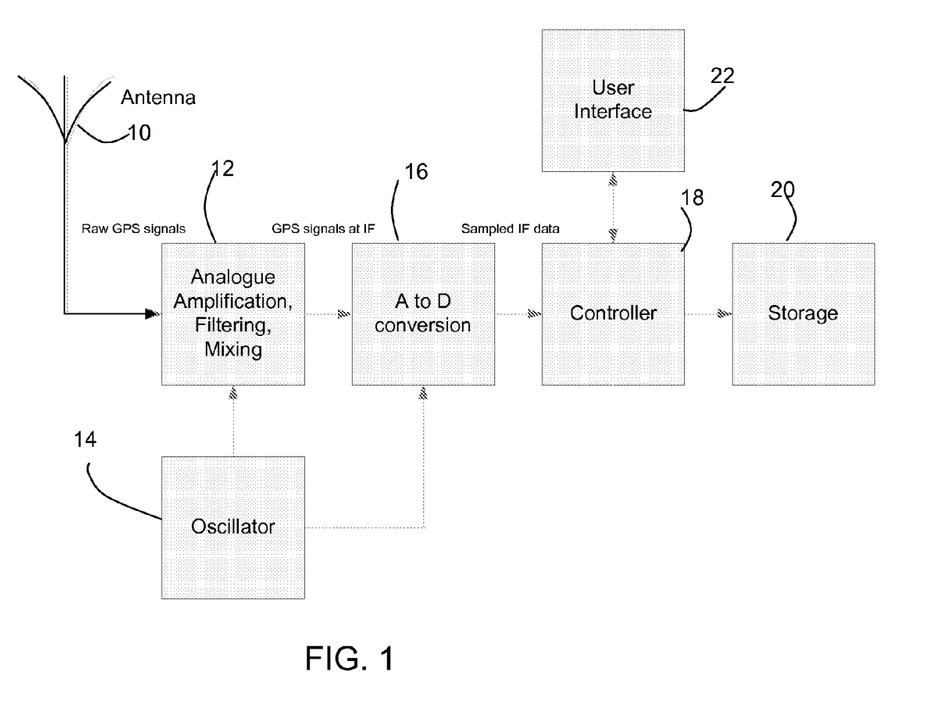
FIG. 1 shows a system of the invention.

To illustrate the invention, an example will be given of a store and process later system, for example for use in a camera so that position and time information can be linked to images stored. The key components of the device are illustrated in FIG. 1.

The signals from the GPS satellites are received by the antenna 10 and then put through conventional analogue processing, typically comprising a combination of amplification, filtering and down mixing in unit 12 driven by a reference oscillator 14 (normally a temperature compensated crystal), followed by ND conversion in unit 16. This is the conventional radio receiver electronics forming the RF front end.

A controller 18, implemented as discrete logic or a micro processor with associated firmware, selects portions of the sampled IF data generated by the RF front end to be stored in the storage device 20, for example a flash RAM, hard disc etc.

The device records short blocks of IF data from the RF front end (these short blocks are termed "grabs" in the following description).

In addition, the device stores an indication of current position, which is provided by a user by means of a graphical user interface (GUI) 22, for example in the form of a menu-based screen or even a keyboard.

The grabs may be for example 100 ms long and they could be recorded once every 10 s. The exact values used could be varied explicitly or implicitly by the user via the GUI 22.

In different applications, different length grabs will be appropriate. Typically, each grab will be shorter than the subframe duration of 6 s, and preferably less than 500 ms.

A short grab can enable a code phase measurement to be obtained. However, in a standard GPS receiver, a code phase measurement is ambiguous (as noted above)—it indicates what fraction of a ms the delay is but not the integer number of ms.

This ambiguity can be resolved in a number of ways:

1) Try all possible delays. SVs tend to be about 20,000 km from the surface of the Earth. In practice, this means that delays observed from the Earth are in the range roughly 65 ms to 85 ms. In theory, all the possible values could be tried (~21 per SV), in the hope that only one gives a sensible result. However, as at least 4 SVs are needed, the number of permutations gets very high very quickly, and more than one set of delays may still be plausible.

2) Establish where the bit edge is. The data bit is 20 ms long (50 bps=>0.02 s/bit) and is aligned with the C/A code so that each data bit is aligned with 20 complete repeats of the 1 ms code. If it can be determined on which code epoch the bit edge occurs, then there is a delay measurement which is ambiguous to 20 ms rather than 1 ms before. This effectively reduces the ambiguity to no more that 2 possible values per SV (in many cases there is no ambiguity) and trying all the permutations becomes perfectly plausible. The only difficulty is how to establish the bit edge. In principal they occur every 20 ms, but only if the data bits change. If there is a long sequence of 1 s or 0 s then there is no bit edge to detect. Furthermore, for weak signals it may be desired to see several bit edges to confirm the bit edge position. Therefore, it may often be necessary to process up to 1 s of data to guarantee a reliable answer.

3) Establish where you are in the data message. Ideally, the code phase and the bit edge should be determined, and also the data message and the Hand Over Word value from word 2 of each subframe should be parsed. To do this, it has to be established where word 2 is, and this means recognising various features of the message (such as the preamble in word 1). This can normally be done with around 6 s of data (depending where you start) but around 12 s of data is required to be absolutely sure, so that two consecutive subframes are obtained with preambles and consecutive HOW values).

As a further complication, solutions 1) & 2) above don't give the absolute time that the signal left the SV, and therefore a guess needs to be made when calculating the position of the SV. As the SVs move quite fast, getting it right to within 0.1 s (or 0.01 s preferably) is important.

Figure 2:
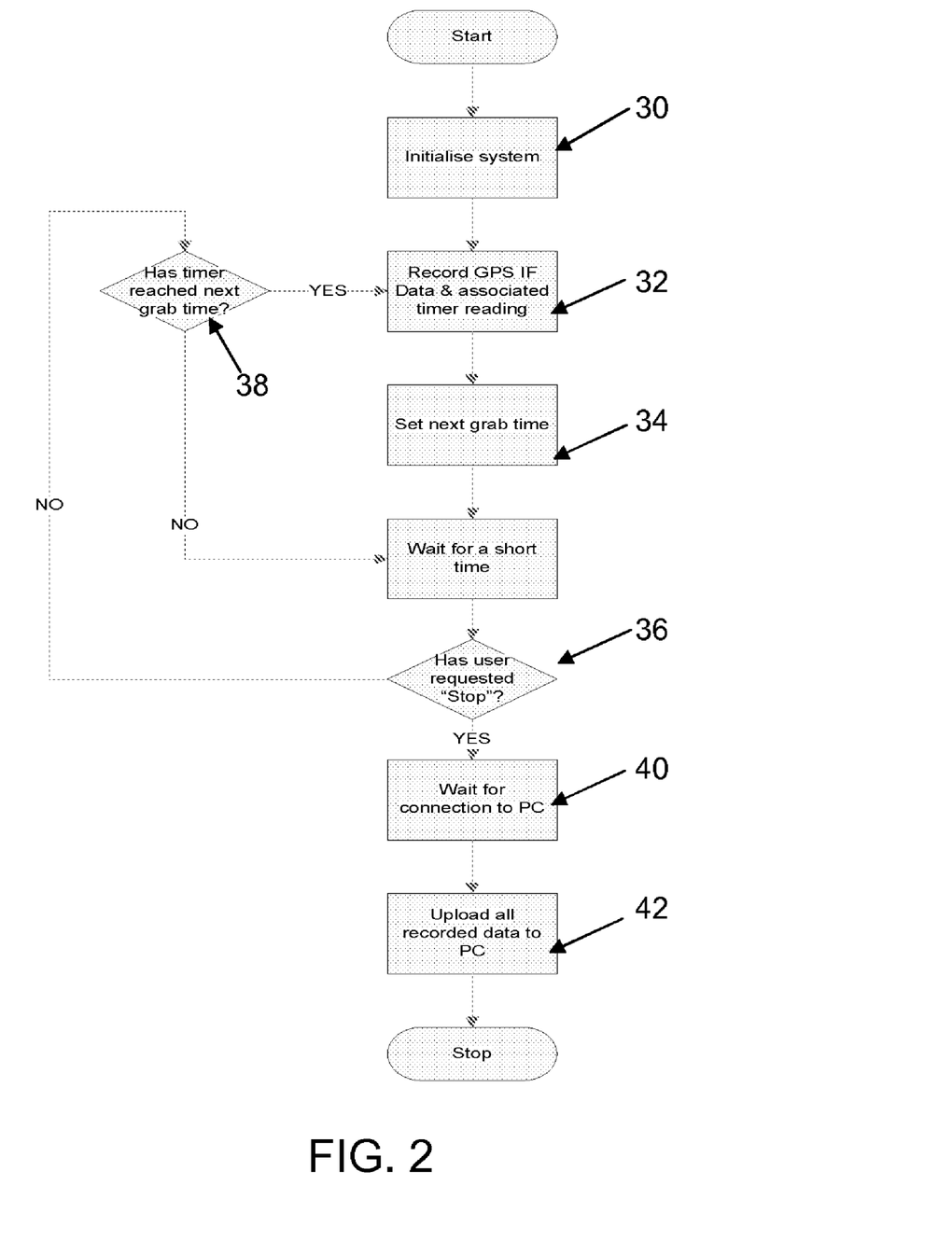
FIG. 2 shows a data recording method used in the system of the invention.

The logic that the controller implements is explained with reference to FIG. 2.

The "Initialise system" step 30 involves selecting how long each grab should be and what the period between grabs is.

The GPS IF data of one grab is stored in step 32, and the timing for the next grab is determined in step 34.

Periodically, there is a test in step 36 to see if the user has instructed the data recording to stop or if the time for the next grab has been reached (step 38). While the time for the next grab has not been reached, the system is in a waiting mode, but monitoring if the recording is stopped.

Step 40 monitors if data can be downloaded, and step 42 relates to the uploading of the recorded grabs to a PC for subsequent processing.

In this case, the processing on a PC would aim to establish the movement of the device whilst it was active. This would be done by processing each of the grabs in order to detect as many SVs as possible and for those SVs to determine code phases/pseudoranges and Doppler shifts as accurately as possible. These measurements from each grab, in association with ephemeris and other constellation data download, can be submitted to a GPS position calculation to get a position for each grab.

In its simplest form, detecting as many SVs as possible involves carrying out a well known two-dimensional code/carrier search (for example reference is made to "Understanding GPS—Principles and Applications, Ed. E. D Kaplan, Artech House, Section 5.1.7—ISBN 0-89006-793-7) for all 32 SVs, with the length of the chosen integration period providing a limit to sensitivity. In practice, using additional information to restrict the size of the search helps with both efficiency and reliability of results.

It is possible to process each of the grabs completely independently. However, the invention proposes the use of an approximate position to give better results more efficiently.

For example, given a single grab with no other information, a search for all 32 SVs over every possible code phase and carrier frequency is likely to be necessary. The size of the carrier frequency range that needs to be searched is driven by the quality of the oscillator in the GPS front end (an oscillator with a 1 ppm error leads to a 1.5 kHz error in the IF for a L1 signal) and the possible Doppler shifts on the signals (SVs observed from the surface of the Earth normally have Doppler shifts in the range +/−4 kHz, and receiver motion can increase this).

The invention makes use of a position estimate to reduce the processing required for the position fixes. In particular, an approximate knowledge of position can be used to overcome the timing ambiguity of the code phase measurement discussed above. As radio signals travel approximately 300 km in 1 ms, knowing position to within a 150 km radius means that there should be no ambiguity at all.

Even if a position estimate is not within this 150 km accuracy, it can still help with the processing of signals, in that it is still possible to determine the SVs that are within view. This means that the correlation calculations can be cut down.

In accordance with the invention, the user inputs to the GPS system an approximate location. This information can be stored with the grabs or it can b be provided later, at the time of processing the grabs (if this is not in real time). This location information can be in the form of a country, town, landmark, postcode, or previously entered location (such as "home", "office", "holiday home", "golf club" etc). If a menu of previously entered locations is used, a database converts the selected site into location information.

Each location can be associated with a range, for example specifying the size of a town or country, or a desired range near to home or the office.

Knowing an estimate of the location narrows the code phase search range over which the processing has to search to find the signal. This means either that the time is reduced (as the search range is covered more quickly), or the sensitivity can be improved (more time can be spent searching each code phase, so that the integration time can be greater, improving the signal to noise ratio, improving the chances of finding a satellite signal).

Improving the likelihood of finding satellites increases the likelihood of being able to perform a GPS fix, as it increases the chance of finding e.g. 4 satellites, and improves the accuracy. If more than 4 satellites are found, then the accuracy of the location fix improves because of more measurement and better geometry, with signals coming from satellites in different directions.

Knowing an estimate of the position also allows the controller to deduce the doppler shift of the signals from the satellites, since it knows the location and velocity of the satellites, and the approximate location of the user/sample. This allows the frequency search range over which the processing has to search also to be reduced somewhat, with similar advantages.

Figure 3:
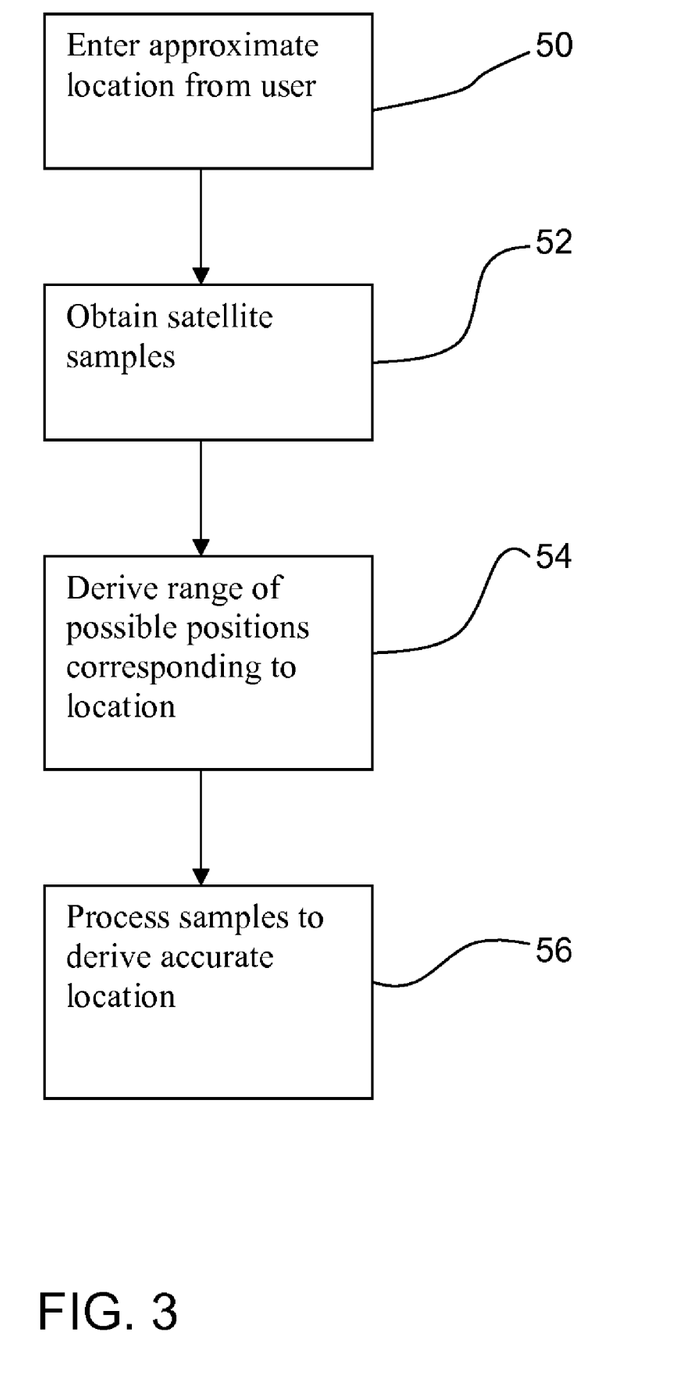
FIG. 3 shows a data processing method used in the system of the invention.

FIG. 3 shows the method of the invention in schematic form.

Step 50 shows the user entering their approximate location. As mentioned above, this can be a position, region, landmark, or pre-programmed menu selection. The user inputs the position as keystrokes or menu selections, for example before taking a photograph, or subsequently when processing the image. The input may be made using a graphical user interface, pointing to a map with a mouse click or indicating a range of locations within a circle or square on a map using a mouse drag.

Although not shown in FIG. 3, the user can re-enter location at any time. Depending on the nature of the apparatus, it can assume that the location has not changed until a new location is entered. Alternatively, it may assume that the location is as most recently entered only for a predetermined time limit. For example, it may be assumed that an entered location is valid for one hour, after which the system will make a request for a new location.

Providing a location estimate can be optional, so that the system will function in entirely conventional manner if no location is given by the user.

Step 52 shows the conventional satellite signal sampling.

Step 54 shows that a location given by a user can be extended to cover a range. For example, a user may specify that "home" means within 10 miles of home, to cover walks, cycle rides etc. This range can be allocated by a database as part of the sample processing, which is shown as step 56.

The location information (including the range of uncertainty) can be used when processing in step 56 to identify narrower SV signal search ranges in which to seek GPS signals.

As outlined above, this allows the GPS receiver to spend computation resources effectively and so find weaker signals. This can also enable ambiguities to be resolved and enable incorrect solutions to be discarded. An approximate location can also be used to provide a starting point for iterative solutions.

The method of FIG. 3 can be applied to on-line processing or to a store and process system. To continue the example of a store and process later system, the processing in step 56 first involves uploading the data.

Ephemeris data is then obtained from a database and this reduces the amount of data which needs to be uploaded from the receiver. The processing essentially involves looking for all possible SVs in the grabs. Once one position fix has been obtained, this can enable the processing of the subsequent grabs to be simplified.

A single grab of e.g. 100 ms of IF data does not by itself contain enough information to calculate an unambiguous position. This is because to establish a full pseudorange, it is necessary to establish the time of transmission of the signal to a very high accuracy. Detecting the signal (i.e. getting the code phase) reveals the fine part of the time (timing within the millisecond), but as the same spreading code is repeated every millisecond, the coarse part of the time is also needed (which millisecond). The absolute GPS time is not needed, as the calculations are based on the relative time delays from the multiple satellites from which signals are received. Conventional GPS receivers achieve the global timing by establishing the position of the bit edge (i.e. the individual bits of the 1500 bit GPS word, which are spaced by 20 ms) and then decoding the data message for a number of seconds until parts of the message can be recognised (such as the subframe preamble and/or the handover word). In the case of a store and process later system, this prolonged processing may not be possible.

The position estimate, if available to within approximately 100 km, can remove the position ambiguity so that the relative timings of all SVs can be deduced from knowledge of the ephemeris and the approximate time (to within approximately 10 s).

An approximate position fix can be done using Doppler measurements (one way of doing this is published as a Masters Thesis by Antti Lehtinen, Tampere University of Technology, http://math.tut.fi/posgroup/DopplerPositioningwith-GPS.pdf). Whilst this is unlikely to be accurate enough for most applications, it can be the basis of a position estimate when approximate position is known.

A number of possible position "guesses" can be chosen in turn and the one that provides the best match can be chosen (a similar approach to this is described in U.S. Pat. No. 6,417, 801).

As explained above, in order to establish a position/velocity fix, it is necessary to obtain the precise orbital parameters of the SVs and the errors in their on-board clocks; which is conveyed by the ephemeris data.

These are broadcast by the SVs as part of the normal data message, repeated every 30 s. Whilst it is theoretically possible to extract such data from lots of short IF grabs, in practice it is much more effective to have one or more reference stations collect the data and populate the database that can be accessed by any PC that wants to process a grab. Clearly as the ephemeris (and other data) changes over time, such a database would need to keep an archive of historical data and be able to provide the appropriate entries for a given time (the ephemeris is generally valid for a 4 hour period, so only a rough sense of time is needed to extract the correct entries).

Such a database could be housed on a server accessible via wired or wireless networking of some form (including the internet). It could also provide additional features such as:

Differential corrections,

Revised health info (being a historical record, it can be corrected for which SVs were healthy at which times, which isn't necessarily the same as which were transmitting that they were healthy at the time), A relief database (providing the altitude as a function of position on the Earth's surface), which could be employed to make fixes more reliable/accurate, Enhanced orbital models, providing more accurate SVs positions and/or longer validity periods (potentially such information could come directly from the GPS ground stations).

The techniques outlined above can be applied to many applications.

The integration of GPS functionality into cameras is only one example. The system can be used for other leisure activities, such as logging of golf rounds, by grabbing IF at every stroke of a golf round (along with which club was used).

Many variants are possible for the location of the processing. The processing can be done in the recording device at a later time (e.g. when external power is available and/or when connection to an ephemeris server is possible). The processing can be implemented in a server rather than the user's PC and the results returned to the user's PC. The processing can be effected in a printer or print booth (especially for grabs associated with photos) rather than a users PC.

The use of a database can be avoided if one or more grabs are made long enough to contain all the necessary ephemeris data. Most of the contents of subframes 1,2 and 3 are required, so that if a grab catches the right 15 s, this could provide all the required information. In the worst case (if the grab starts at the wrong moment just when ephemeris data is changing, which happens once every 2 hrs normally) around 45 s may be needed.

The invention has been described in connection with single frequency GPS, but other GNSS systems (GLONASS, Galileo etc) would be similar. Indeed the techniques could also be applied to multiple frequency systems, with appropriate means of capturing the IF data from each carrier.

In the example above, a sequence is described of receiving a position estimate from the user, receiving GPS signals, and processing. The receiving or capture of the signals from the satellite may equally precede the input of a position estimate by the user, or indeed the tasks can take place in parallel. Thus, the steps of user input and satellite sample capture can take place in any order, and the claims are not intended to be limited in this respect.

As is clear from the description above, the invention can be applied to real time systems or to store and process later systems. A real time system will typically be implemented as a laptop which is internet-connected. There may not then be a good position estimate available, for example from cellular telephony systems, and such a system will often be used indoors with weak satellite signals so that the improvement provided by the invention is significant. Laptops have a large screen and user interface, and access to internet databases of place locations, for example. Thus, the input of user data is easy in such a system.

In the store and process later application, user input is particularly useful, as only the user knows roughly where the samples were taken in the past (e.g. during a holiday). This location can be unrelated to the user's location when the samples are being processed, so that the user's input about what was the situation at the time of signal capture is particularly useful.

A GPS position fix may be made even more accurate by the user with further user input, for example to change the location from a location corresponding to the camera position to a location of the object being photographed.

In the example above, it is suggested that the user's approximate location assists all GPS position fixes. Instead, the system may request assistance from the user only when a poor signal is detected. Thus, the processor can attempt a position fix, without user location estimate. This may for example use Doppler measurements to perform an initial position estimate (as mentioned above). If this is not successful, the user can be asked for a location, and the processor then reattempts the position fix with the additional information, with a higher degree of success. The user can be prompted for more accurate information (district of a city rather than city name, for example) if required.

Various other modifications will be apparent to those skilled in the art.

The invention claimed is:

1. A method of processing signals from a satellite positioning system, the method comprising:
    receiving an indication of approximate location which has been provided directly by a user;
    receiving data samples broadcast from the satellite positioning system at a location corresponding to the received indication;
    processing the received data samples using the received indication of approximate location to derive a more accurate position than the approximate location.

2. The method as in claim 1, wherein receiving the indication of approximate location comprises:
    receiving a geographical place name or a landmark name; and deriving corresponding position information using a database.

3. The method as in claim 1, wherein receiving the indication of approximate location comprises:
    receiving a user-selected place name; and
    deriving corresponding position information using a database.

4. The method as in claim 1, further comprising:
    deriving from the approximate location a range of possible position values for use in processing the received data samples.

5. The method as in claim 1, wherein the received data samples comprise intermediate frequency downconverted data samples.

6. The method as in claim 1, wherein the satellite broadcast data comprise Code Divison Multiple Access (CDMA) data.

7. The method as in claim 1, further comprising:
    converting the indication of approximate location into longitude and latitude ranges for use when processing the samples.

8. The method as claimed in claim 1, further comprising:
    requesting from an external service conversion of the indication of approximate location into longitude and latitude ranges for use when processing the samples; and
    receiving the longitude and latitude ranges.

9. The method as in claim 1, wherein the processing of samples takes place when and where the data samples are received.

10. The method as in claim 1, further comprising:
    storing the data samples, and wherein the processing of samples takes place subsequently and not necessarily where the samples are received.

11. The method as in claim 10, further comprising:
    storing the indication of approximate location with the data samples.

12. The method as in claim 10, wherein the indication of approximate location is provided after storing the data samples, and at or before the time when processing the samples.

13. The method as in claim 1, wherein receiving directly from a user an indication of approximate location comprises:
receiving a user input as keystrokes or selections using a graphical user input of a portable Global Positioning System (GPS) receiver device.

14. A method of operating a satellite positioning system, the method comprising:
entering, by a user, an approximate indication of current position;
receiving data samples broadcast from the satellite positioning system; and
processing the received samples using the approximate indication of current position to derive a more accurate position than the approximate indication.

15. A system for collecting data from a satellite positioning system, the system comprising:
a user interface adapted to receive from a user an indication of approximate location;
a satellite receiver for receiving data samples broadcast from the satellite positioning system; and
processing means for processing the received data samples using the indication of approximate location to derive a more accurate position than the approximate indication.

16. The method of claim 1, further comprising:
receiving different levels of accuracy from the user.

17. The method of claim 1, further comprising:
using the more accurate position to deduce a Doppler shift of signals from the satellite positioning system.

18. The method of claim 1, wherein a server performs the processing step and sends the more accurate position to the user.

19. The method of claim 1, further comprising:
detecting whether signal quality from the satellite positioning system is poor.

20. The method of claim 1, further comprising:
after determining that signal quality is poor, requesting assistance from the user.

* * * * *